United States Patent
Abdel-Rahman

(10) Patent No.: US 12,037,351 B1
(45) Date of Patent: Jul. 16, 2024

(54) REVERSIBLE PHOTOSWITCHABLE ISOMERIZATION OF NOVEL STERICALLY HINDERED 2,2',6,6'-TETRAMETHYL-4,4'-BIS((TRIMETHYLSILYL)ETHYNYL) AZOBENZENE

(71) Applicant: KING FAISAL UNIVERSITY, Al-Ahsa (SA)

(72) Inventor: Obahdah Subhi Abdel-Rahman, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/544,286

(22) Filed: Dec. 18, 2023

(51) Int. Cl.
 *C07F 7/08* (2006.01)
 *C07F 7/20* (2006.01)

(52) U.S. Cl.
 CPC .......... *C07F 7/081* (2013.01); *C07F 7/0827* (2013.01); *C07F 7/20* (2013.01); *C07B 2200/09* (2013.01); *C07B 2200/13* (2013.01)

(58) Field of Classification Search
 None
 See application file for complete search history.

(56) References Cited

FOREIGN PATENT DOCUMENTS

| | | |
|---|---|---|
| CN | 109456348 A | 3/2019 |
| EP | 3712132 A1 | 9/2020 |

OTHER PUBLICATIONS

Yin et al., Synthesis and properties of conjugated bimetallic ruthenium complexes with σ, σ-bridging azobenzene chains, Journal of Organometallic Chemistry, vol. 690, Issue 19, Oct. 1, 2005, pp. 4265-4271.

*Primary Examiner* — Joseph R Kosack
(74) *Attorney, Agent, or Firm* — Nath, Goldberg & Meyer; Joshua B. Goldberg

(57) ABSTRACT

A reversible photo-switchable isomerization of novel sterically hindered 2,2',6,6'-tetramethyl-4,4'-bis((trimethylsilyl)ethynyl)azobenzene and its synthesis.

8 Claims, 2 Drawing Sheets

REVERSIBLE PHOTOSWITCHABLE ISOMERIZATION OF NOVEL STERICALLY HINDERED 2,2',6,6'-TETRAMETHYL-4,4'- BIS((TRIMETHYLSILYL)ETHYNYL) AZOBENZENE

BACKGROUND

1. Field

The present disclosure relates to a compound that is a reversible photoswitchable sterically hindered 2,2',6,6'-tetramethyl-4,4'-bis((trimethylsilyl)ethynyl)azobenzene, its photoswitchable isomerization, and its synthesis.

2. Description of the Related Art

Azoarylene (also known as diazene or diimide) derivatives are reversible photo switchable chemical compounds composed of two aryl rings linked by a N═N double bond which can change their structural geometry and chemical properties upon irradiation with electromagnetic radiation. Those reversible photoswitchable compounds have been intensively investigated and attracted enormous interests to clarify the mechanism of cis-/trans-isomerization and to understand their applications utilizing alteration of the chemical structures in terms of photoswitching and high-density information optical storage devices.

Azoarylenes are highly accessible through a straightforward step of classical homo-oxidative cross-coupling of aryl diazonium salts using Cu-catalyzed Sandmeyer-style reaction. The product of orange chromophores usually show remarkable a strong π→π* transition in the visible (Vis) regime of the electromagnetic radiation which can be predictively tuned by introducing substituents on the aryl rings.

Azoarylenes generally undergo an ultraviolet (UV) light (λ~340-380 nm) triggered transition from a thermally stable apolar trans-form to a polar cis-configuration with a bent conformation (dipole moment of about 3.1 Debye). On the other hand, storing azoarylenes in the dark or under visible light of the electromagnetic radiation (λ~420-490 nm) will reverse the transition process. Trans-azoarylenes are planar compounds with a N═N distance of about 1.195 Å, while the cis-azobenzenes are non-planar with a C—N═N—C dihedral angle of about 175.2°.

SUMMARY

The present compound is a photo switchable isomerization of novel sterically hindered 2,2',6,6'-tetramethyl-4,4'-bis((trimethylsilyl)ethynyl)azobenzene with four methyl groups on the ortho-positions. This compound was synthesized via traditional Pd/Cu catalyzed Sonogashira cross-coupling of 2,2',6,6-tetramethyl-4,4'-diiodoazobenzene with trimethylsilylacetylene (TMSA) according to classical procedures.

The identity of this novel sterically hindered compound follows the correct numbers and integrations of its $^1$H-NMR data. $^1$H-NMR spectrum shows three singlet signals, with the four aromatic equivalent protons resonating at δ=7.23 ppm, another singlet observed at δ=0.23 ppm for the two TMS protecting groups, and a sharp singlet at δ=1.83 ppm for the methyl protons.

In an embodiment, the present subject matter relates to a sterically hindered 2,2',6,6'-tetramethyl-4,4'-bis((trimethylsilyl)ethynyl)azobenzene compound having the formula I:

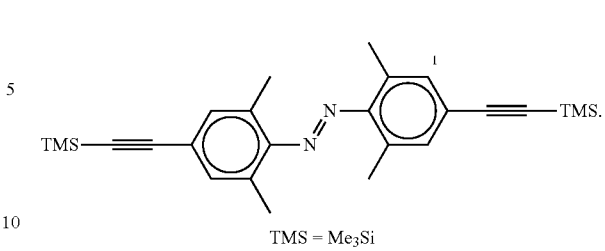

TMS = Me$_3$Si

In a further embodiment, the present subject matter relates to a compound that may be switched between trans- and -cis isomers by irradiation of electromagnetic radiation.

In one more embodiment, the present subject matter relates to a method of making the sterically hindered 2,2',6,6'-tetramethyl-4,4'-bis((trimethylsilyl)ethynyl)azobenzene, the method comprising: adding a degassed solution of 2,2',6,6'-tetramethyl-4,4'-diiodoazobenzene, triphenylphosphine, and trimethylsilylacetylene (TMSA) in dry triethylamine to a mixture of CuI and PdCl$_2$(PPh$_3$)$_2$ in tetrahydrofuran (THF) to obtain a reaction mixture; stirring and heating the reaction mixture for at least about 8 hours to obtain a precipitate; evaporating solvent under vacuum and dissolving the precipitate in CH$_2$Cl$_2$; filtering dissolved precipitate to purify the precipitate; and obtaining the sterically hindered 2,2',6,6'-tetramethyl-4,4'-bis((trimethylsilyl)ethynyl)azobenzene.

These and other features of the present subject matter will become readily apparent upon further review of the following specification.

DETAILED DESCRIPTION OF THE PREFERRED EMBODIMENTS

Figure 1:
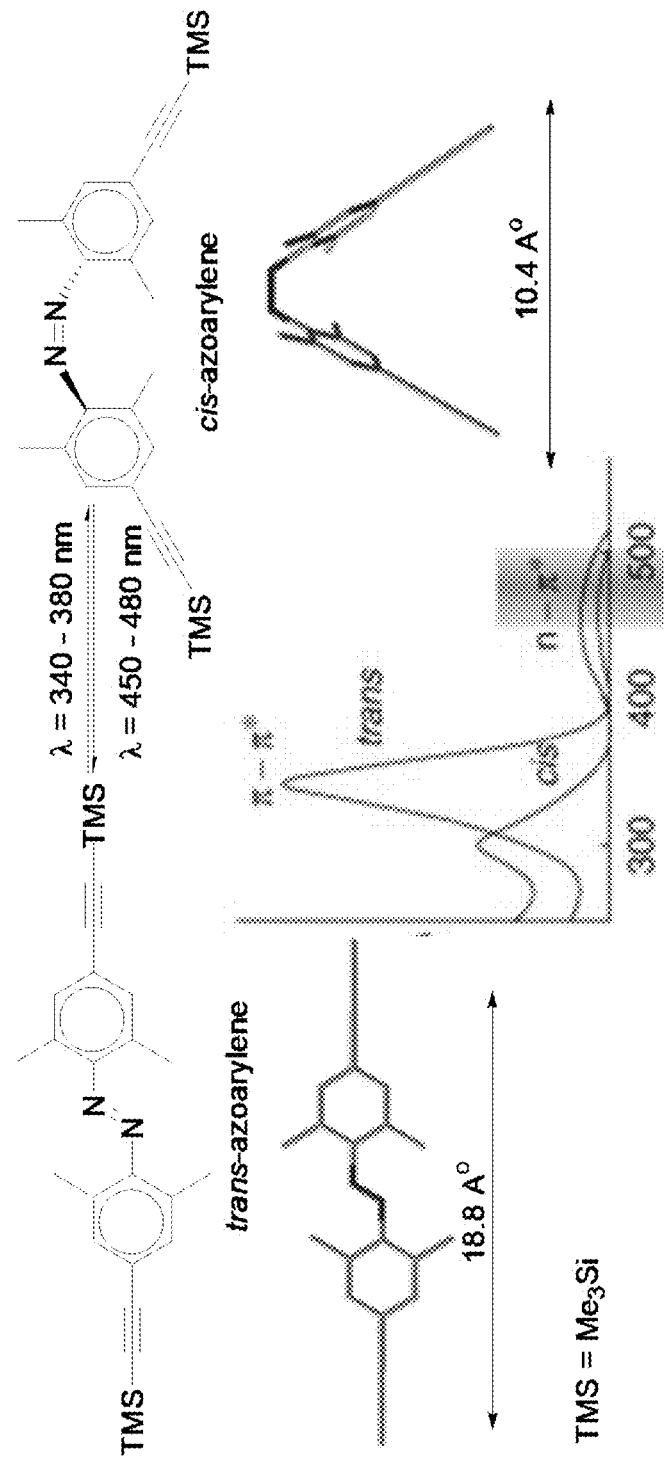
FIG. 1 shows a reversible photo switchable isomerization of sterically hindered 2,2',6,6'-tetramethyl-4,4'-bis((trimethylsilyl)ethynyl)azobenzene.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a novel sterically hindered 2,2',6,6'-tetramethyl-4,4'-bis((trimethylsilyl)ethynyl)azobenzene with four bulky methyl groups on the ortho-positions, which was successfully prepared via classical Pd/Cu catalyzed Sonogashira cross-coupling of 2,2',6,6'-tetramethyl-4,4'-diiodoazobenzene with trimethylsilylacetylene (TMSA). This compound is a chromophore and remarkably shows a strong $\pi \to \pi^*$ transition in the Visible (Vis) regime and undergoes photoswitching of trans- and cis-isomers which are highly controlled by irradiation of electromagnetic radiation.

The identity of this novel sterically hindered compound follows the correct numbers and integrations of its $^1$H-NMR data. $^1$H-NMR spectrum shows three singlet signals, with the four aromatic equivalent protons resonating at δ=7.23 ppm, another singlet observed at δ=0.23 ppm for the two TMS protecting groups, and a sharp singlet at δ=1.83 ppm for the methyl protons.

In an embodiment, the present subject matter relates to a sterically hindered 2,2',6,6'-tetramethyl-4,4'-bis((trimethylsilyl)ethynyl)azobenzene having the formula I:

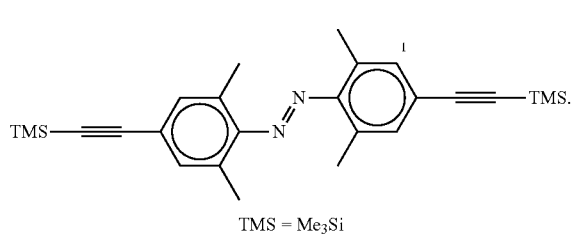

TMS = Me$_3$Si

In another embodiment, the present subject matter relates to a photo switchable compound between trans- and -cis isomers by irradiation of electromagnetic radiation.

In one more embodiment, the photo switchable application may be useful in high-density information optical storage devices The present subject matter relates to a method of making the sterically hindered 2,2',6,6'-tetramethyl-4,4'-bis((trimethylsilyl)ethynyl)azobenzene with four bulky methyl groups on the ortho-positions. The sterically hindered 2,2',6,6'-tetramethyl-4,4'-bis((trimethylsilyl)ethynyl)azobenzene is synthesized via classical Pd/Cu catalyzed Sonogashira cross-coupling of 2,2',6,6'-tetramethyl-4,4'-diiodoazobenzene with trimethylsilylacetylene (TMSA).

The method for synthesizing the sterically hindered 2,2',6,6'-tetramethyl-4,4'-bis((trimethylsilyl)ethynyl)azobenzene comprises: adding 2,2',6,6'-tetramethyl-4,4'-diiodoazobenzene, triphenylphosphine, and trimethylsilylacetylene (TMSA) in dry triethylamine to a solution of CuI and PdCl$_2$(PPh$_3$)$_2$ in tetrahydrofuran to obtain a reaction mixture; stirring and heating the reaction mixture to reflux overnight to obtain a precipitate; evaporating solvent under vacuum and dissolving the precipitate in CH$_2$Cl$_2$; filtering dissolved precipitate to purify the precipitate; and obtaining the sterically hindered 2,2',6,6'-tetramethyl-4,4'-bis((trimethylsilyl)ethynyl)azobenzene according to Scheme 1.

Scheme 1

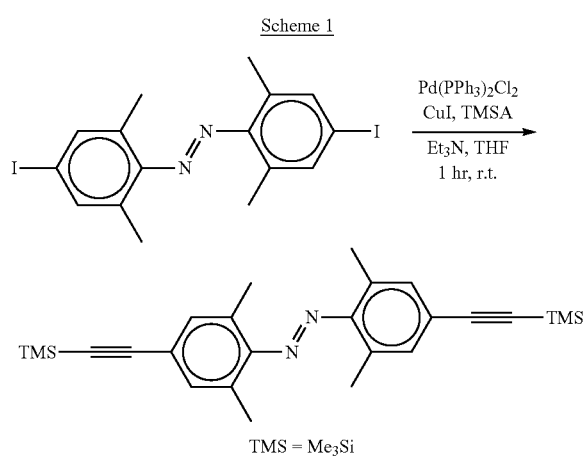

TMS = Me₃Si

In another embodiment of the present production methods, additional (TMSA) may be added for complete reaction of the 2,2',6,6'-tetramethyl-4,4'-diiodoazobenzene.

In a further embodiment of the present production methods, the precipitate may be purified over silica gel.

In an embodiment of the present production methods, the purification may be by column chromatography, which may be performed using petroleum ether and dichloromethane in a 9:1 ratio as an eluent.

In an additional embodiment of the present production methods, the sterically hindered 2,2',6,6'-tetramethyl-4,4'-bis((trimethylsilyl)ethynyl)azobenzene may be obtained as an orange crystalline solid.

The following examples relate to various methods of manufacturing the specific compounds and application of the same, as described herein. All compound numbers expressed herein are with reference to the synthetic pathway figures shown above.

EXAMPLES

Example 1

Preparation of 2,2',6,6'-tetramethyl-4,4'-bis((trimethylsilyl)ethynyl)azobenzene A degassed solution of 2,2',6,6'-tetramethyl-4,4'-diiodoazobenzene (0.9 mmol), triphenylphosphine (3 mol %), and 0.4 mL (2.7 mmol, 3 eq.) of excess trimethylsilylacetylene (TMSA) in dry 15 mL triethylamine was added to a mixture of CuI (10 mol %) and PdCl₂(PPh₃)₂ (5 mol %) in 15 mL THF. The resulting mixture was stirred and heated to reflux overnight. Additional amounts of TMSA were added to ensure complete consumption of the starting material (TLC control). When the reaction was finished, the solvent was evaporated under vacuum and the residue was taken up in 5 mL $CH_2Cl_2$ and filtered over silica gel. Purification by column chromatography (eluent: petroleum ether/dichloromethane, 9:1) gave the desired 2,2',6,6'-tetramethyl-4,4'-bis((trimethylsilyl)ethynyl)azobenzene as an orange crystalline solid.

Figure 2:
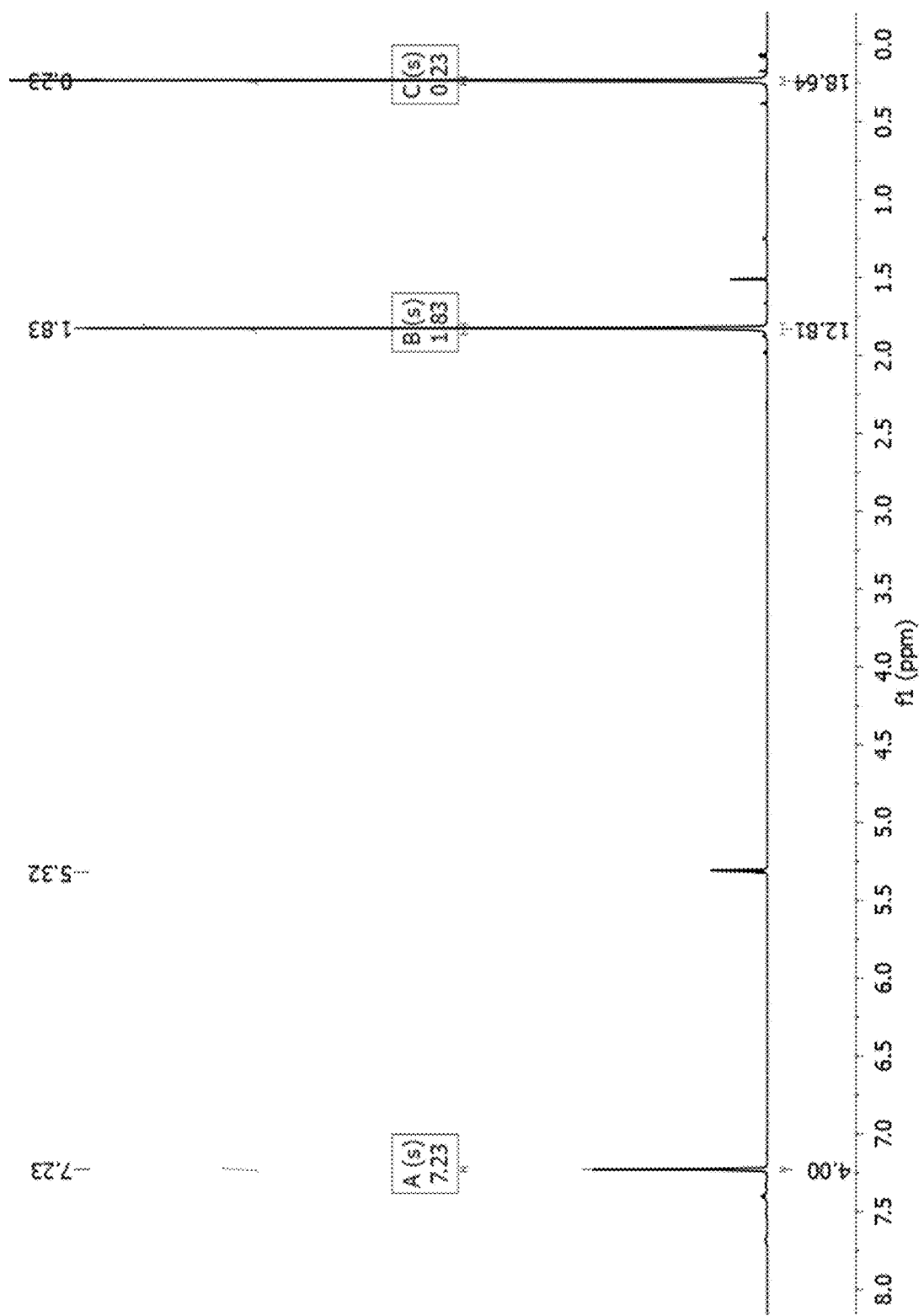
FIG. 2 shows the $^1$H-NMR spectrum (400 MHz, CD$_2$Cl$_2$) of 2,2',6,6'-tetramethyl-4,4'-bis((trimethylsilyl)ethynyl) azobenzene.

Characterization of the prepared compound was determined using ¹H-NMR (400 MHz, $CD_2Cl_2$): δ 7.23 (s, 4H, $H_{(1)}$), 1.83 (s, 12H, 4Me), 0.23 (s, 18H, 2SiMe₃) ppm, as seen in FIG. 2.

Elemental analysis for $C_{26}H_{34}N_2Si_2$: C: 72.50; H: 7.96; N: 6.50. Found: C: 72.35; H: 7.95; N: 6.48%.

The identity of this novel sterically hindered compound follows the correct numbers and integrations of its ¹H-NMR data. ¹H-NMR spectrum shows three singlet signals of the four aromatic equivalent protons which resonated at δ=7.23 ppm, another singlet observed at δ=0.23 ppm for the two TMS protecting groups, and a sharp singlet at δ=0.23 ppm for the two TMS protecting groups and a sharp singlet at δ=1.83 ppm for the methyl protons.

Example 2

Experimentation: Photo Switchable Cis- and Trans-Isomerization

The reversible conversion between the two trans- and cis-configurations of azoarylenes is highly controlled by irradiation of electromagnetic radiation. The most stable, trans-configuration can be converted to the less stable, cis-configuration using a UV wavelength of 340-380 nm. Visible illumination on the other hand at wavelength of 450-480 nm converts the azoarylene back to the trans-form as depicted in the sole figure. The two reversible azoarylene configurations are interchangeable by excitation of $S_0 \rightarrow S_1$ (assigned to the n→π* transition) or $S_0 \rightarrow S_2$ (corresponding to the π→π* transition). The $S_0 \rightarrow S_2$ excitation in trans-configuration exhibits a strong absorption in the UV-regime at 312 nm, while $S_0 \rightarrow S_1$ excitation exhibits a much weaker absorption band in the visible (Vis) at 478 nm. On the other hand, $S_0 \rightarrow S_2$ excitation of cis-azoarylene is relatively weaker than that of the trans form at about 280 nm, and $S_0 \rightarrow S_1$ excitation is relatively stronger than that of the trans form at about 450 nm.

Accordingly, the successfully prepared novel sterically hindered 2,2',6,6'-tetramethyl-4,4'-bis((trimethylsilyl)ethynyl)azobenzene with four bulky methyl groups on the ortho-positions shows a remarkably strong π→π* transition in the Visible (Vis) regime and underwent photoswitchable of trans- and cis-isomers which is highly controlled by irradiation of electromagnetic radiation.

It is to be understood that the sterically hindered 2,2',6,6'-tetramethyl-4,4'-bis((trimethylsilyl)ethynyl)azobenzene with four bulky methyl groups on the ortho-positions and compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:
1. A sterically hindered 2,2',6,6'-tetramethyl-4,4'-bis((trimethylsilyl)ethynyl)azobenzene complex having the formula I:

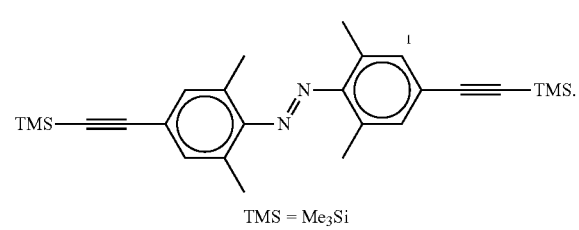

TMS = Me₃Si

2. The sterically hindered 2,2',6,6'-tetramethyl-4,4'-bis((trimethylsilyl)ethynyl)azobenzene of claim 1, wherein the compound is an orange crystalline solid.

3. A method of making the sterically hindered 2,2',6,6'-tetramethyl-4,4'-bis((trimethylsilyl)ethynyl)azobenzene of claim 1, the method comprising:
  adding 2,2',6,6'-tetramethyl-4,4'-diiodoazobenzene, triphenylphosphine, and trimethylsilylacetylene (TMSA) in dry triethylamine to a solution of CuI and $PdCl_2(PPh_3)_2$ in tetrahydrofuran (THF) to obtain a reaction mixture;
  stirring and heating the reaction mixture for at least about 8 hours to obtain a precipitate;
  evaporating solvent under vacuum and dissolving the precipitate in $CH_2Cl_2$;
  filtering dissolved precipitate to purify the precipitate; and
  obtaining the sterically hindered 2,2',6,6'-tetramethyl-4,4'-bis((trimethylsilyl)ethynyl)azobenzene.

4. The method of making the sterically hindered 2,2',6,6'-tetramethyl-4,4'-bis((trimethylsilyl)ethynyl)azobenzene of claim 3, wherein additional TMSA is added for complete reaction of 2,2',6,6'-tetramethyl-4,4'-diiodoazobenzene.

5. The method of making the sterically hindered 2,2',6,6'-tetramethyl-4,4'-bis((trimethylsilyl)ethynyl)azobenzene of claim 3, wherein the precipitate is purified over silica gel.

6. The method of making the sterically hindered 2,2',6,6'-tetramethyl-4,4'-bis((trimethylsilyl)ethynyl)azobenzene of claim 3, wherein the filtered precipitate is purified using column chromatography.

7. The method of making the sterically hindered 2,2',6,6'-tetramethyl-4,4'-bis((trimethylsilyl)ethynyl)azobenzene of claim 6, wherein the column chromatography is performed using petroleum ether and dichloromethane in a 9:1 ratio as an eluent.

8. The method of making the sterically hindered 2,2',6,6'-tetramethyl-4,4'-bis((trimethylsilyl)ethynyl)azobenzene of claim 3, wherein the sterically hindered 2,2',6,6'-tetramethyl-4,4'-bis((trimethylsilyl)ethynyl)azobenzene is obtained as an orange crystalline solid.

\* \* \* \* \*